US 6,628,037 B2

(12) United States Patent
Matsuzawa

(10) Patent No.: US 6,628,037 B2
(45) Date of Patent: Sep. 30, 2003

(54) POWER GENERATOR, ELECTRONIC DEVICE USING THE SAME, METHOD OF SETTING PLATE THICKNESS IN A MAGNETIC CIRCUIT IN ELECTRONICALLY CONTROLLED TIMEPIECE AND POWER GENERATOR

(75) Inventor: Kinya Matsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 10/002,033

(22) Filed: Nov. 15, 2001

(65) Prior Publication Data

US 2002/0130585 A1 Sep. 19, 2002

(30) Foreign Application Priority Data

Nov. 17, 2000 (JP) ........................................ 2000-351396

(51) Int. Cl.[7] ................................................. H02K 1/12
(52) U.S. Cl. ........................................ 310/254; 310/216
(58) Field of Search ................................ 310/216, 217, 310/254; 428/611, 900

(56) References Cited

U.S. PATENT DOCUMENTS 6,462,456 B1 * 10/2002 DeCristofaro et al. ...... 310/216

FOREIGN PATENT DOCUMENTS

JP 9-218279 8/1997 ............ G04C/3/00

* cited by examiner

Primary Examiner—Burton Mullins
(74) Attorney, Agent, or Firm—Mark P. Watson

(57) ABSTRACT

In a power generator (20) including a rotor (21), a stator (magnetic core) (22) and a coil (23), a formula (1) including hysteresis loss coefficient $k_h$, eddy-current loss coefficient $k_e$, resistivity $\rho$ ($\Omega \cdot m$), frequency f (Hz) and maximum amplitude magnetic flux density $B_m$ (T) is applied in setting plate thickness of the stator (22). Since the plate thickness (d) (m) of the stator (22) is set to the minimum iron loss plate thickness (d) obtained by the formula (1), the iron loss of the magnetic circuit of the power generator can be reduced, thereby improving efficiency of the power generator.

28 Claims, 7 Drawing Sheets

POWER GENERATOR, ELECTRONIC DEVICE USING THE SAME, METHOD OF SETTING PLATE THICKNESS IN A MAGNETIC CIRCUIT IN ELECTRONICALLY CONTROLLED TIMEPIECE AND POWER GENERATOR

FIELD OF THE INVENTION

The present invention relates to a power generator, electronic device using the power generator and a method of setting plate thickness in a magnetic circuit in electronically controlled timepiece and power generator. More specifically, it relates to a technique for reducing iron loss of a power generator to improve efficiency thereof.

BACKGROUND ART

Small-sized and portable electronic devices such as a timepiece, a cellular phone and a portable information tool are ordinarily driven by electric power supplied by a battery. However, electronic devices requiring no battery exchange and simultaneously improving usability and ecological friendliness have been known in recent years, in which a power generator having a rotor rotated by an oscillating weight or a main spring to generate power is installed.

Since various functions are installed in such portable electronic devices, increase in generated power is desired. However, enlarging the size of the power generator for increasing the generated power amount deteriorates portability of the electronic device and therefore cannot be employed.

Accordingly, in order to improve the efficiency of the power generator (increase the generated power amount), decrease in iron loss (hysteresis loss, eddy-current loss) of the magnetic circuit of the power generator is desired.

An object of the present invention is to provide a power generator capable of decreasing iron loss of the magnetic circuit of the power generator to improve the efficiency of the power generator, an electronic device having the power generator, an electronically controlled timepiece, and a plate thickness setting method of a magnetic circuit of the power generator.

DISCLOSURE OF THE INVENTION

A power generator according to an aspect of the present invention has: a rotor having a permanent magnet; a stator and a magnetic core of soft magnetic material constituting a magnetic circuit; and a coil wound around the magnetic core, in which the plate thickness d (m) of the soft magnetic material constituting at least one of the stator and the magnetic core is set at a value represented by the following formula of $$d = \sqrt{\frac{k_h}{k_e}\rho} \cdot f^{-0.375} B_m^{-0.175} \quad (1)$$

where $k_h$ represents hysteresis loss coefficient, $k_e$ represents eddy-current loss coefficient, $\rho$ ($\Omega \cdot m$) represents resistivity, f (Hz) represents frequency and $B_m$ (T) represents maximum amplitude magnetic flux density of the soft magnetic material.

The principle of the formula (1) will be described below. Incidentally, PC permalloy material is taken as an example in the following explanation and a part of coefficients etc. is different in the other material. However, the principle and the formula based thereon are common irrespective of the material.

The iron loss W of the power generator is an addition of the hysteresis loss $W_h$ and the eddy-current loss $W_e$. The hysteresis loss $W_h$ and the eddy-current loss $W_e$ can be obtained as follows.

(A) Hysteresis Loss $W_h$

With regard to the hysteresis loss for one cycle per unit area, Steinmetz experimentally deduces the following formula for electromagnetic steel plate.

$$W_h \approx k_h B_m^{\eta}$$

In the above, $W_h$: hysteresis loss (J/m$^3$), $k_h$: proportion constant, $B_m$: maximum amplitude magnetic flux density (T), $\eta$: proportion constant.

It is generally well known that the size of grain of the material is substantially in inverse proportion to direct current coercive force, which shows that the hysteresis loss is in inverse proportion to the plate thickness. Considering the fact, following formula can be deduced, which can be defined as the hysteresis loss:

$$W_h \approx k_h d^{-1} B_m^{\eta}$$

In the above, $k_h$: proportion constant, d: plate thickness (m).

(B) Eddy-Current Loss

The iron loss is formulated based on the concept of abnormal eddy-current loss coefficient. The eddy-current loss can be represented using the abnormal eddy-current coefficient as follows:

$$W_e = k_{ae} \frac{1}{6\rho} \pi^2 f d^2 B_m^2$$

In other words, the eddy-current loss can be represented as the eddy-current loss formula of classical theory multiplied by the abnormal eddy-current loss coefficient $k_{ae}$ obtained by an experiment. In the above, $k_{ae}$: abnormal eddy-current loss coefficient, $W_e$: eddy-current loss (J/m$^3$), $\eta$: resistivity ($\Omega \cdot m$), f: frequency (Hz), d: plate thickness (m), $B_m$: maximum amplitude magnetic flux density (T).

(C) Calculation of Proportion Constant

The hysteresis loss is calculated by measuring direct-current magnetic characteristics by assigning the plate thickness, base on the result of which the maximum amplitude magnetic flux density and the $k_h$ and $\eta$ of the above $W_h$ formula can be approximately represented as in the following formula.

$$W_h \approx 1.72 \times 10^{-3} d^{-1} B_m^{1.65}$$

Further, alternating-current magnetic characteristics is measured by assigning plate thickness, the maximum amplitude magnetic flux density and the frequency, based on the result of which the $k_{ae}$ of the above $W_e$ formula can be approximately represented as in the following formula.

$$W_e = k_{ae} \frac{1}{6\rho} \pi^2 f d^2 B_m^2$$

$$\cong (1.6 \times 10^{-3} d^{-1} f^{-0.25}) \left( \frac{\pi^2 d^2 f B_m^2}{6\rho} \right)$$

$$= 2.63 \times 10^{-3} \frac{1}{\rho} df^{0.75} B_m^2$$

When the hysteresis loss coefficient $k_h=1.72*10^{-3}$, and the eddy-current loss coefficient $k_e=2.63*10^{-3}$ in the above $W_e$ and $W_h$ formulae, the iron loss $W=W_h+W_e$ can be represented as in the following formula (6).

$$W \cong k_h d^{-1} B_m^{1.65} + k_e \frac{1}{\rho} df^{0.75} B_m^2 \quad (6)$$

In the above, $W_h$: hysteresis loss (J/m$_3$), $W_e$: eddy-current loss (J/m$^3$), $k_h$: hysteresis loss coefficient, d: plate thickness (m), $B_m$: maximum amplitude magnetic flux density (T), $k_e$: eddy-current loss coefficient, $\rho$: resistivity ($\Omega$·m), f: frequency (Hz).

The plate thickness d for minimizing the iron loss W can be obtained by the formula (6), which can be modified into a formula representing d as in the above-described formula (1).

According to the present invention, the plate thickness d for minimizing the iron loss W can be calculated by assigning the hysteresis loss coefficient $k_h$, the eddy-current loss coefficient $k_e$, the resistivity $\rho$ ($\Omega$·m) determined by the material of the stator and the magnetic core made of soft magnetic material such as permalloy, and the frequency f (Hz) and the maximum amplitude magnetic flux density $B_m$ (T) determined based on design of the power generator into the above-described formula (1).

Accordingly, the iron loss of the power generator can be decreased by designing the stator and the magnetic core with the plate thickness d, thereby improving efficiency of the power generator (increasing the amount of generated power).

Though the hysteresis loss coefficient $k_h$ and the eddy-current loss coefficient $k_e$ have to be calculated in advance by experiment, usually four types of permalloy material (Supermalloy, PC permalloy, PD permalloy, PB permalloy) are used for the power generator and the hysteresis loss coefficient $k_h$ and the eddy-current loss coefficient $k_e$ can be obtained in advance per the respective types.

Accordingly, in designing the power generator, the hysteresis loss coefficient $k_h$, the eddy-current loss coefficient $k_e$, and the resistivity $\rho$ defined by the selected soft magnetic material and the maximum amplitude magnetic flux density $B_m$ and the frequency f defined during design process in accordance with the required performance are assigned to the above-described formula (1), so that the appropriate plate thickness d for minimizing the iron loss W can be easily calculated and the highly efficient power generator can be easily designed and produced.

Therefore, increase in generated power amount and size reduction of the power generator can be achieved, so that installation of multi-function and reduction in size and weight can be achieved in various electronic devices and electronically controlled timepiece in which the power generator is incorporated.

In the present invention, the soft magnetic material constituting at least one of the stator and the magnetic core may preferably be PC permalloy material, and the plate thickness d (m) of the PC permalloy material may preferably be set at a value represented by the following formula of $$d=\sqrt{0.654\rho} \cdot f^{-0.375} B_m^{-0.175} \quad (2)$$

where $\rho$ ($\Omega$·m) represents resistivity, f (Hz) represents frequency and $B_m$ (T) represents maximum amplitude magnetic flux density of the PC permalloy material.

According to the above arrangement, appropriate plate thickness d can be easily obtained for the PC permalloy material which is often used as a stator of the power generator.

Similarly, following formula is used in the arrangement using the Supermalloy material:

$$d=\sqrt{0.137\rho} \cdot f^{-0.375} B_m^{-0.175} \quad (3)$$

Similarly, following formula is used in the arrangement using the PD permalloy material:

$$d=\sqrt{1.339\rho} \cdot f^{-0.375} B_m^{-0.175} \quad (4)$$

Similarly, following formula is used in the arrangement using the PB permalloy material:

$$d=\sqrt{3.049\rho} \cdot f^{-0.375} B_m^{-0.175} \quad (5)$$

According to the above arrangements, appropriate plate thickness d can be easily obtained for the Supermalloy material which is often used as a stator and a magnetic core of the power generator, PD permalloy material and PB permalloy material which are often used as a magnetic core of the power generator.

A power generator according to another aspect of the present invention has: a rotor having a permanent magnet; a stator and a magnetic core of soft magnetic material constituting a magnetic circuit; and a coil wound around the magnetic core, in which the plate thickness d (m) of the soft magnetic material constituting at least one of the stator and the magnetic core is set within a plate thickness range determined so that iron loss W does not exceed a reference value $W_2$, the reference value $W_2$ being obtained by a thickness d obtained in accordance with the following formula (1), where $k_h$ represents hysteresis loss coefficient, $k_e$ represents eddy-current loss coefficient, $\rho$ ($\Omega$·m) represents resistivity, f (Hz) represents frequency and $B_m$(T) represents maximum amplitude magnetic flux density of the soft magnetic material, which is assigned to the following formula (6) to calculate a minimum value $W_1$ of the iron loss W (J/m$^3$), the reference value $W_2$ being set greater than the minimum value $W_1$.

$$d = \sqrt{\frac{k_h}{k_e} \rho} \cdot f^{-0.375} B_m^{-0.175} \quad (1)$$

$$W \cong k_h d^{-1} B_m^{1.65} + k_e \frac{1}{\rho} df^{0.75} B_m^2 \quad (6)$$

According to the above arrangement, even when the plate thickness d cannot be set at a thickness for minimizing the iron loss on account of process and strength limitation, the plate thickness range can be designed so that the iron loss W is not more than the reference value $W_2$ defined by multiplying the minimum iron loss value $W_1$ by a predetermined value or adding a predetermined constant to the minimum iron loss value $W_1$ (differing in accordance with material and used circumstances). Accordingly, the power generator of small iron loss and high efficiency can be designed and manufactured while satisfying conditions (such as strength) other than iron loss.

The reference value $W_2$ may be set as a value multiplying the minimum iron loss value $W_1$ with a predetermined value. The most appropriate value may differ in accordance with type and usage of the soft magnetic material, and appropriate setting may preferably be used based on experiment and experience.

For instance, the setting may preferably be changed between an arrangement where the device using the power generator of the present invention uses a main spring capable of constantly supplying the kinetic energy as a drive source for generating power and another arrangement using drive source of an oscillating weight rotated by an external force. Specifically, some electronically controlled wristwatch and a portable small electronic device use an oscillating weight rotated by an external force as a drive source of the power generator. In the devices, the oscillating weight is rotated by a movement in accordance with walk of those wears the watch and vibration in accordance with drive of an automobile installed with the device, where the rotary movement is used as a drive energy. Used environment of such drive of the oscillating weight greatly differs from a drive source generating constant drive force such as a general-type motor and a main spring in that the drive may instantaneously be increased.

Even when the usage is the same, the reference value $W_2$ can greatly differ in accordance with the composition of the soft magnetic material (such as PC permalloy, Supermalloy and PD permalloy).

For instance, when the PC permalloy is used as the soft magnetic material constituting at least one of the stator and the magnetic core, the plate thickness d (m) of the PC permalloy material is set within a plate thickness range determined so that iron loss W does not exceed a reference value $W_2$, the reference value $W_2$ being obtained by a thickness d obtained in accordance with the following formula (2), where ρ (Ω·m) represents resistivity, f (Hz) represents frequency and $B_m$ (T) represents maximum amplitude magnetic flux density of the PC permalloy material, which is assigned to the following formula (6) to calculate a minimum value $W_1$ of the iron loss W (J/m³), the reference value $W_2$ being set 1.088 times as great as the minimum value.

$$d = \sqrt{0.654\rho} \cdot f^{-0.375} B_m^{-0.175} \quad (2)$$

$$W \cong 1.72 \times 10^{-3} d^{-1} B_m^{1.65} + 2.63 \times 10^{-3} \frac{1}{\rho} df^{0.75} B_m^2 \quad (7)$$

According to the above arrangement, the appropriate plate thickness range can be easily obtained for the PC permalloy material which is often used as a stator of a power generator.

Incidentally, when the power generator uses an oscillating weight rotated by an external force and the PC permalloy is used as the soft magnetic material, the reference value $W_2$ of 1.760 times as great as the minimum value $W_1$ may preferably be set.

Similarly, when Supermalloy is used as the soft magnetic material, the reference value $W_2$ of 2.355 times as great as the minimum value $W_1$ may preferably be set using the following formulae (3) and (8).

$$d = \sqrt{0.137\rho} \cdot f^{-0.375} B_m^{-0.175} \quad (3)$$

$$W \cong 0.36 \times 10^{-3} d^{-1} B_m^{1.65} + 2.63 \times 10^{-3} \frac{1}{\rho} df^{0.75} B_m^2 \quad (8)$$

According to the above arrangement, appropriate plate thickness range can be easily obtained for the Supermalloy material which is often used as a stator of a power generator.

Incidentally, when the power generator uses an oscillating weight rotated by an external force and the Supermalloy is used as the soft magnetic material, the reference value $W_2$ of 3.634 times as great as the minimum value W1 may preferably be set.

Similarly, when PD permalloy is used as the soft magnetic material, the reference value $W_2$ of 2.729 times as great as the minimum value $W_1$ may preferably be set using the following formulae (4) and (9).

$$d = \sqrt{1.339\rho} \cdot f^{-0.375} B_m^{-0.175} \quad (4)$$

$$W \cong 23.58 \times 10^{-3} d^{-1} B_m^{1.65} + 2.63 \times 10^{-3} \frac{1}{\rho} df^{0.75} B_m^2 \quad (9)$$

According to the above arrangement, appropriate plate thickness range can be easily obtained for the PD permalloy material which is often used as a magnetic core of a power generator.

In the above, at least one of the stator and the magnetic core may preferably be made of a single layer or a lamination of the soft magnetic material of the plate thickness d.

Accordingly, the respective plates can be set at a plate thickness capable of reducing the iron loss and necessary magnetic flux number and strength can be secured by laminating an appropriate number of the plates.

When the lamination structure is used, even when the total thickness is the same, the thickness of the respective layers is decreased (thinned) by increasing the lamination number. When the respective material layers are too thin, handlability thereof is deteriorated and saturation magnetic flux density problem can be caused on account of decrease in the cross section area.

Accordingly, it is found in the present invention that a restriction may preferably be set for the minimum thickness of the respective material layers in using the lamination structure. Following arrangement can be used as a specific value based on a result of experiment and experience.

For instance, the soft magnetic material constituting at least one of the stator and the magnetic core may preferably have a lamination structure, and the respective layers forming the lamination structure may preferably have a minimum thickness of not less than 0.05 mm.

An electronic device according to still another aspect of the present invention has the above power generator and a processor actuated by the electric energy generated by the power generator. Such electronic device includes cellular phone, PHS (simple cellular phone), automobile and house key (key having a processor such as a light and a keyless entry), radio, personal computer, desk-top calculator, IC card etc. The present invention can be suitably used for a small-sized portable electronic device.

An electronically controlled timepiece according to further aspect of the present invention has: the above power generator; and a processor for driving a time display by the electric energy generated by the power generator.

According to the above electronic device and electronically controlled timepiece, since the efficiency of the power generator can be improved, multi-function can be provided by increasing the amount of the generated power and the size and weight of the electronic device and electronically controlled timepiece can be reduced by reducing the size of the power generator.

A method according to still further aspect of the present invention is for setting plate thickness in a magnetic circuit in a power generator, the power generator including a rotor having a permanent magnet, a stator and a magnetic core made of a soft magnetic material constituting the magnetic circuit and a coil wound around the magnetic core, in which the plate thickness d is set at a value represented by the following formula of $$d = \sqrt{\frac{k_h}{k_e}\rho} \cdot f^{-0.375} B_m^{-0.175} \quad (1)$$

where $k_h$ represents hysteresis loss coefficient, $k_e$ represents eddy-current loss coefficient, $\rho$ ($\Omega \cdot m$) represents resistivity, f (Hz) represents frequency and $B_m$ (T) represents maximum amplitude magnetic flux density of the soft magnetic material.

According to the above aspect of the present invention, the plate thickness capable of minimizing the iron loss W can be easily obtained, so that highly efficient power generator can be easily designed and produced.

Incidentally, in the present aspect of the method of setting the plate thickness, as described in the power generator, the formulae (2) to (5) for giving the plate thickness d in accordance with the type of the soft magnetic material can be used.

A method according to still further aspect of the present invention is for setting plate thickness in a magnetic circuit in a power generator, the power generator including a rotor having a permanent magnet, a stator and a magnetic core made of a soft magnetic material constituting the magnetic circuit and a coil wound around the magnetic core, in which the plate thickness d is set within a plate thickness range determined so that iron loss W does not exceed a reference value $W_2$, the reference value $W_2$ being obtained by a thickness d obtained in accordance with the following formula (1), where $k_h$ represents hysteresis loss coefficient, $k_e$ represents eddy-current loss coefficient, $\rho$ ($\Omega \cdot m$) represents resistivity, f (Hz) represents frequency and $B_m$ (T) represents maximum amplitude magnetic flux density of the soft magnetic material, which is assigned to the following formula (6) to calculate a minimum value $W_1$ of the iron loss W (J/m³), the reference value $W_2$ being set greater than the minimum value $W_1$.

$$d = \sqrt{\frac{k_h}{k_e}\rho} \cdot f^{-0.375} B_m^{-0.175} \quad (1)$$

$$W \cong k_h d^{-1} B_m^{1.65} + k_e \frac{1}{\rho} d f^{0.75} B_m^2 \quad (6)$$

According to the above aspect of the present invention, even when the plate thickness d cannot be set at a thickness for minimizing the iron loss on account of limitation in processing and strength, the plate thickness range can be designed so that the iron loss W is not more than the reference value $W_2$ defined by multiplying the minimum iron loss value $W_1$ by a predetermined value or adding a predetermined constant to the minimum iron loss value $W_1$ (differing in accordance with material and used circumstances). Accordingly, the power generator of small iron loss and high efficiency can be designed and manufactured while satisfying conditions (such as strength) other than iron loss.

The reference value $W_2$ may be set as a value multiplying the minimum iron loss value $W_1$ with a predetermined value. The most appropriate value can differ in accordance with type and usage of the soft magnetic material, and appropriate setting may preferably be used based on experiment and experience.

Even when the usage is the same, the reference value $W_2$ can be greatly differed in accordance with the composition of the soft magnetic material (such as PC permalloy, Supermalloy and PD permalloy).

For instance, when the soft magnetic material constituting at least one of the stator and the magnetic core is PC permalloy material, the plate thickness d (m) of the PC permalloy material may preferably be set within a plate thickness range determined so that iron loss W does not exceed a reference value $W_2$, the reference value $W_2$ being obtained by a thickness d obtained in accordance with the following formula (2), where $\rho$ ($\Omega \cdot m$) represents resistivity, f (Hz) represents frequency and $B_m$ (T) represents maximum amplitude magnetic flux density of the PC permalloy material, which is assigned to the following formula (7) to calculate a minimum value $W_1$ of the iron loss W (J/m³), the reference value $W_2$ being set 1.088 times as great as the minimum value $W_1$ when a drive source of the power generator is not an oscillating weight rotated by an external force, and the reference value $W_2$ being set 1.760 times as great as the minimum value $W_1$ when a drive source of the power generator is an oscillating weight rotated by an external force.

Similarly, when the soft magnetic material constituting at least one of the stator and the magnetic core is Supermalloy material, the minimum value $W_1$ may preferably be calculated by the formulae (3) and (8) and the reference value $W_2$ may preferably be set 2.355 times as great as the minimum value $W_1$ when a drive source of the power generator is not an oscillating weight rotated by an external force, and the reference value $W_2$ may preferably be set 3.634 times as great as the minimum value $W_1$ when a drive source of the power generator is an oscillating weight rotated by an external force.

Similarly, when the PD permalloy is used as the soft magnetic material, the reference value $W_2$ which is 2.729 times as great as the minimum value $W_1$ may preferably be set using the formulae (4) and (9).

In the method of setting a plate thickness according to the above aspect of the present invention, the soft magnetic material used for the stator or the magnetic core may be of a single layer or a laminated body. The layer structure can be determined according to the following steps.

Specifically, with regard to the plate thickness d exhibiting the minimum value $W_1$ and a total thickness D required for the stator or the magnet core, when the plate thickness d exceeds the total thickness D, a single-layer structure of the thickness D may preferably be used, and when the thickness d is smaller than the total thickness D, a lamination structure of a plurality of plate materials including a layer of the plate thickness d may preferably be used.

By constructing a plate of minimum iron loss with a single layer, production thereof can be facilitated.

A first plurality of combinations of a plurality of plate materials including a layer of thickness d exhibiting the minimum value $W_1$ may preferably be set in constructing the lamination structure and a combination among the first plurality of combinations exhibiting the iron loss W not more than the reference value $W_2$ may preferably be adopted when there is the combination exhibiting the iron loss not more than the reference value $W_2$ in the first combinations, and, when there is no combination exhibiting the iron loss not more than the reference value $W_2$ in the first combinations, a second plurality of combinations of a plurality of plate materials of total thickness D including a layer of iron loss greater than the layer of the plate thickness d may preferably be set and a combination among the second plurality of combinations exhibiting the iron loss W not more than the reference value $W_2$ may preferably be adopted when there is the combination exhibiting the iron loss not more than the reference value $W_2$ in the second combinations.

According to the above steps, the soft magnetic material having appropriate layer structure and plate thickness of suitable iron loss can be arranged.

Incidentally, in setting the layer structure, restriction may preferably be provided for the minimum thickness of the respective material layers. Specific plate thickness etc. is as described above in the description of the power generator, which is omitted here.

DETAILED DESCRIPTION OF PREFERRED EMBODIMENT(S)

Embodiments of the present will be described below with reference to the attached drawings.

Figure 1:
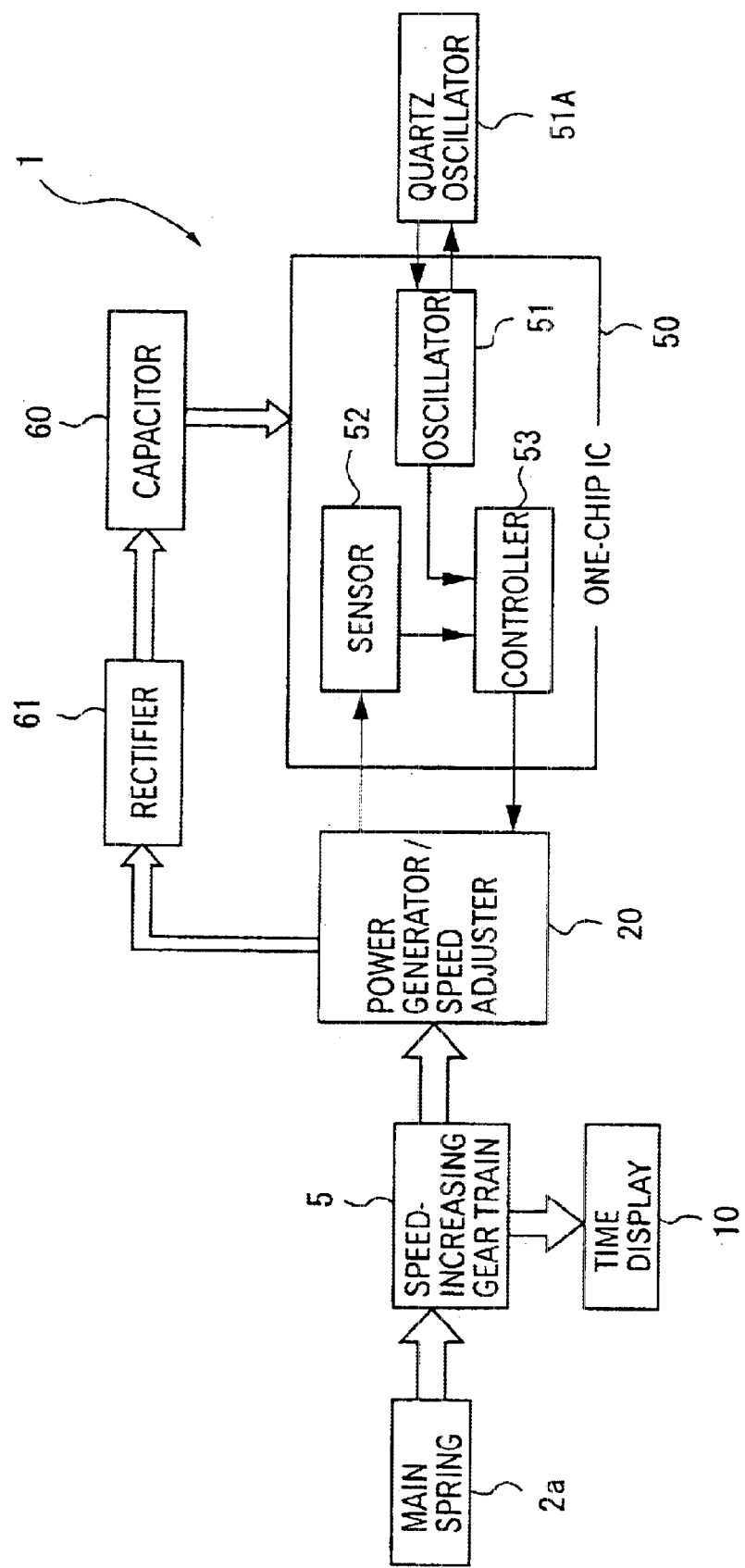
FIG. 1 is a block diagram showing an arrangement of an electronically controlled mechanical timepiece according to an embodiment of the present invention.
Figure 2:
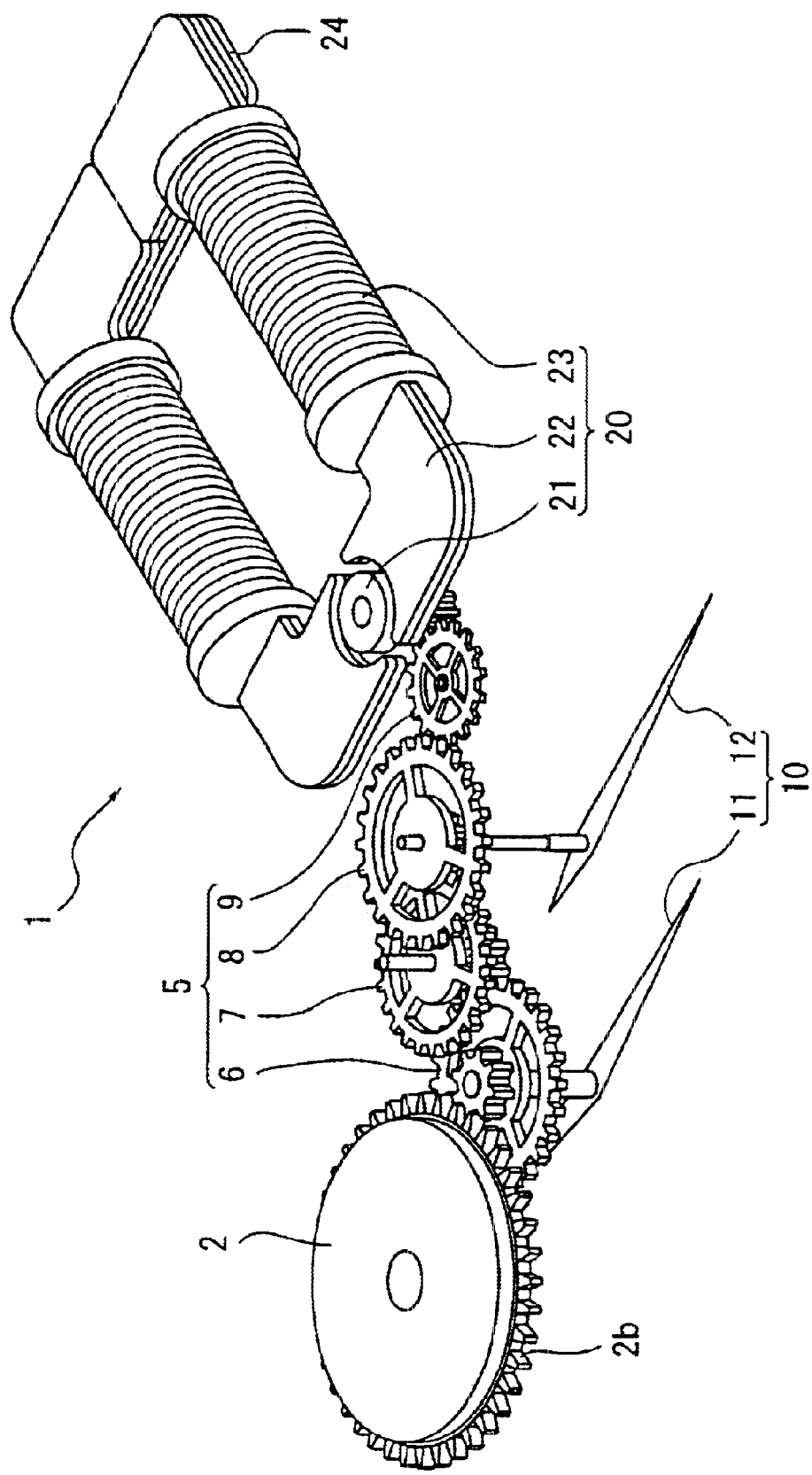
FIG. 2 is a schematic perspective view showing a primary portion of the electronically controlled mechanical timepiece according to the embodiment shown in FIG.

FIG. 1 is a block diagram showing an outline of an electronically controlled mechanical timepiece 1 as an electronic device having a power generator applied with the present invention, FIG. 2 is a perspective view showing a primary portion thereof.

The electronically controlled mechanical timepiece 1 transfers a mechanical energy from a main spring 2a to a power generator (power generating device) 20 through a speed-increasing gear train 5 to drive the power generator 20. The power generator 20 generates induction power to output an electric energy. The alternate output from the power generator 20 is boosted and rectified by a rectifier 61 conducting boost rectification, full-wave rectification, half-wave rectification, transistor rectification etc. and is supplied and charged to a capacitor 60 as a power source circuit.

A rotation sensor 50 is driven by an electric power supplied by the capacitor 60. The rotation controller 50 includes an oscillator 51, a rotation sensor 52 of the power generator 20, and a controller 53 of the power generator 20, which is constructed by one-chip IC.

The oscillator 51 outputs an oscillation signal using a quartz oscillator 51A as a time standard source. The frequency of the oscillation signal is divided and is inputted to the controller 53.

On the other hand, the rotation sensor 52 detects the rotation of the power generator 20 based on the output thereof etc. to output a rotation detection signal.

The controller 53 compares the rotation detection signal of the rotation sensor 52 with the reference signal from the oscillator 51 and outputs a signal for adjusting a speed of the power generator 20 to the power generator 20 in accordance with the difference between the signals. A speed-adjusting mechanism of the power generator 20 is actuated by the signal so that the speed of the power generator 20 is adjusted to be synchronized with the reference signal.

Incidentally, the speed of the power generator 20 is adjusted by, for instance, brake-controlling by applying short brake by closed loop between the respective terminals of the power generator 20, or alternatively, by connecting variable resistor to the power generator 20 to change an electric-current value flowing through the coil of the power generator 20.

The speed of the power generator 20 is adjusted to a constant speed, so that the hand 10 attached to the speed-increasing gear train 5 interlocking with the rotation of the power generator 20 is driven at a predetermined speed, thereby displaying time.

More specifically, as shown in FIG. 2, a barrel gear wheel 2b of a barrel gear 2 is rotated by the mechanical energy of the main spring 2a (not shown in FIG. 2), the rotation being transferred to a rotor 21 through the speed-increasing gear train 5 composed of a second wheel and pinion 6, a third wheel and pinion 7, a sweep second wheel and pinion 8 and a fifth wheel and pinion 9. A minute hand 11 is fixed to the second wheel and pinion 6, a second hand 12 is fixed to the sweep wheel and pinion 8 and an hour hand is fixed to an hour wheel (not shown) respectively, the hour hand, the minute hand 11 and the second hand 12 constituting the hand 10.

The power generator has a rotor 21 having a permanent magnet, a stator (core, magnetic core) 22, and a coil 23. The stator 22 is a pair of C-shaped stator of identical configuration. The coil 23 having the same winding number is wound on the outer circumference of the magnetic core and the both coils 23 are connected in series.

Semicircular stator hole is formed on an end of the stator 22, where the rotor 21 is disposed. Side ends of the other end of the stator 22 are in close contact and a connector plate 24 is fixed thereon bridging the respective ends.

The respective stators 22 and the connector plate 24 are made of a soft magnetic material such as PC permalloy and are arranged as a double-laminated type with two plate materials laminated thereon. The present invention is applied in setting the respective plate thickness d of the stator 22 integrated with the magnetic core with the coil 23 wound therearound.

Incidentally, since the magnetic core is integrated with the stator 22 in the present embodiment, the plate thickness thereof is simultaneously set. The plate thickness of the connector plate 24 is set in the same manner. Plate thickness setting according to the present invention will be described below.

In the present embodiment, various permalloy materials (PC, Supermalloy, PB, PD) are used for the stator. The characteristics of the respective permalloy material are shown in the following Table 1. Incidentally, the hysteresis loss coefficient $k_h$ and the eddy-current loss coefficient $k_e$ in the Table 1 are obtained in advance by experiment. The Supermalloy belongs to permalloy C in JIS and is a material having the highest permeability in the material.

TABLE 1

| | PC | Supermalloy | PB | PD |
|---|---|---|---|---|
| Composition | 76% Mo—Cu—Fe | 79% Ni—Mo—Fe | 45% Ni—Fe | 36% Ni—Fe |
| JIS Standard | Permalloy C | Permalloy C | Permalloy B | Permalloy D |
| Hysteresis Loss Coefficient | $1.72 \times 10^{-3}$ | $0.36 \times 10^{-3}$ | $28.50 \times 10^{-3}$ | $23.58 \times 10^{-3}$ |
| Eddy-Current Loss Coefficient | $2.63 \times 10^{-3}$ | ← | ← | ← |
| Resistivity ($\mu\Omega \cdot mm$) | 60 | 60 | 45 | 75 |

For instance, when the stator 22 is made of PC permalloy, in order to set the plate thickness in accordance with the present invention, the hysteresis loss coefficient $k_h$, the eddy-current loss coefficient $k_e$, and the resistivity $\rho$ are assigned to the above-described formula (1). Subsequently, the frequency f (8Hz in the present embodiment) and the maximum amplitude magnetic flux density (alternate maximum magnetic flux density) $B_m$ (0.2T in the present embodiment) of the electronically controlled mechanical timepiece 1 are further assigned thereto, so that the plate thickness d is calculated as approximately 0.38 mm.

Figure 3:
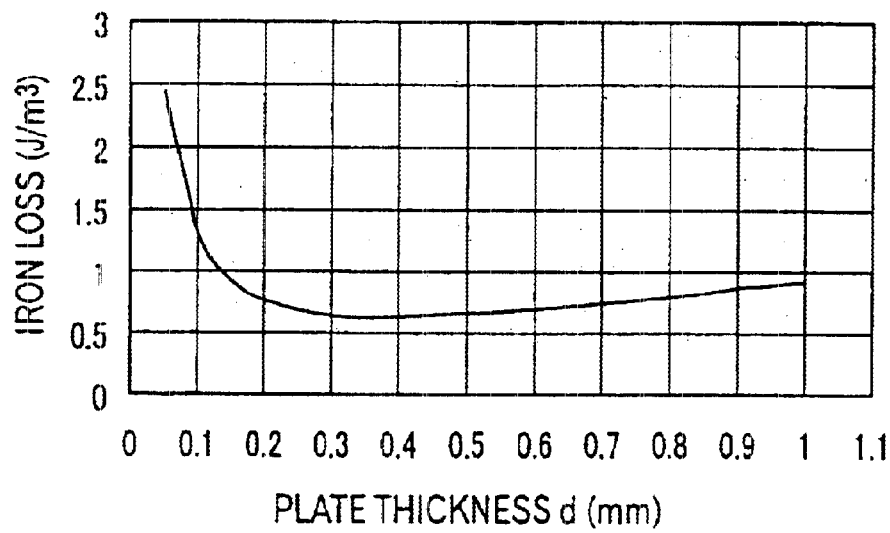
FIG. 3 is a graph showing a relationship between iron loss and plate thickness in a stator of the embodiment shown in FIG. 1 using PC material.

The relationship between the iron loss and the plate thickness d is obtained by assigning the values to the above-described formula (6), which is shown in the graph of FIG. 3. It can be seen also from the graph that the iron loss W takes the minimum value $W_1$ (approximately $0.635J/m^3$) when the plate thickness d is approximately 0.38 mm.

The calculation of the plate thickness of, for instance, PC permalloy, can be further simplified by using the above-described formula (2) since the constants in accordance with the material are incorporated in advance. In the same manner, the formula (3) can be used for the Supermalloy, the formula (4) can be used for the PD material, and the formula (5) can be used for the PB material.

Incidentally, it can be seen from the graph of FIG. 3 that the iron loss steeply increases when the plate thickness becomes smaller than the plate thickness d having the minimum iron loss and the iron loss gradually increases when the plate thickness becomes greater. Accordingly, though the iron loss becomes great to an extent, the range capable of keeping the iron loss smaller than the conventional arrangement can be found.

Such range can be defined by calculating the minimum value $W_1$ of the iron loss W ($J/m^3$) by assigning the thickness d calculated by the formula (1), and by setting a reference value $W_2$ greater than the minimum value $W_1$, as a range where the iron loss is less than or the same as the reference value $W_2$.

After various experiments, it has been found that the iron loss of PC material can be made smaller than the conventional product by setting the plate thickness so that the reference value $W_2$ of the iron loss does not exceed the minimum value $W_1$ multiplied by 1.088. It has also been found that the value 2.355 is suitable for the Supermalloy and the value 2.729 is suitable for the PD material.

Accordingly, when the stator 22 is made of PC material, the reference value W2 is set at $0.692J/m^3$ and the plate thickness d for setting the iron loss W below the reference value $W_2$ is set within the range between approximately 0.30 to 0.55 mm.

Incidentally, the reference value $W_2$ may be defined in accordance with material and usage thereof.

For instance, the reference value $W_2$ may be set approximately twice (1 to 1.2 $J/m^3$) as great as the minimum value W1 so that the plate thickness d of the stator 22 of the present embodiment is set within the range of approximately 0.1 to 1 mm. Or, alternatively, the plate thickness may be set within the range of approximately 0.2 to 0.75 mm so that the iron loss W does not exceed $0.8J/m^3$. On the other hand, when the iron loss has to be limited within a small range, the reference value $W_2$ may be set at the minimum value $W_1$ multiplied by 1.05, i.e. within the range of approximately 0.30 to 0.50 mm so that the iron loss W becomes around $0.66J/m^3$. Further alternatively, the plate thickness may be set at approximately 0.38 mm for obtaining the minimum value $W_1$ without using the reference value $W_2$.

On the other hand, the actual plate thickness d is set within the above range considering strength, weight, dimension, processability, production efficiency, production cost etc. of the stator 22 and the magnetic core.

Figure 4:
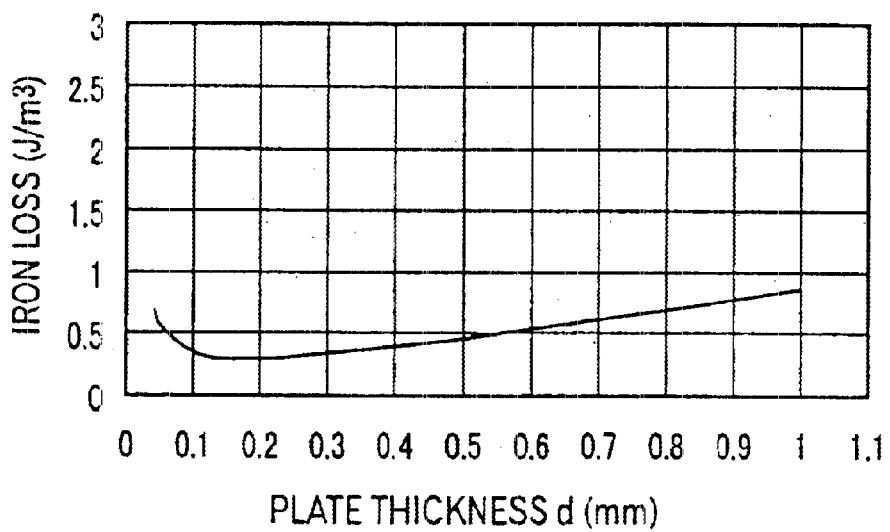
FIG. 4 is a graph showing a relationship between iron loss and plate thickness in a stator of the embodiment shown in FIG. 1 using Supermalloy material.

For instance, since the coil 23 is wound around the magnetic core for several thousand turns, the size of the magnetic core may preferably be set as small as possible. Accordingly, when enough cross section cannot be obtained, it is desirable that sufficient magnetic flux is obtained with the use of material of high saturation magnetic flux density such as PB and PD material with the sacrifice of some iron loss. On the other hand, since some thickness (cross section) can be secured for the stator 22, it is preferable that a predetermined magnetic flux is secured considering the iron loss rather than the magnetic flux density. In other words, PC or Supermalloy is preferable as a material having high permeability, capable of restraining hysteresis loss, having small electric resistivity and capable of restraining eddy-current loss. The graph similar to FIG. 3 for the Supermalloy is shown in FIG. 4.

Incidentally, since the stator 22 and the magnetic core are integrated in the power generator 20 of the present embodiment, the material and plate thickness of the stator 22 are set considering various conditions such as performance required for the stator and the magnetic core.

For instance, it is required to laminate a plurality of plates for securing the magnetic flux, so that the lamination structure is selected as well as selecting the material.

In the present embodiment, the structure of the stator 22 is set, for instance, according to the following steps.

Initially, when the plate thickness for applying the minimum value W1 is d and the total thickness required for the stator 22 is D, single-layer structure of the thickness D is used where the plate thickness d exceeds the total thickness D and the lamination structure of total thickness D composed of plate materials including the layer of plate thickness d is used when the plate thickness d is smaller than the total thickness D.

Applying specific values, in order to secure total thickness D=0.5 mm in accordance with design of the stator 22, since the iron loss of single-layer PC material of 0.5 mm thickness (0.5*1) is less than the reference value $W_2$=$0.692J/m^3$, the single-layer material can be directly used as the stator 22. However, whether the lamination structure can be applied or not is further checked.

In order to employ the lamination structure, a plurality of combinations of plate materials having total thickness D including a layer of plate thickness d which takes the minimum value $W_1$ are set, and when a combination having iron loss W less than or the same as the reference value $W_2$ is found in the combinations, the combination is used. When such combination is not found, another plurality of combinations of plate materials having total thickness D and including a layer of plate thickness having greater iron loss than the layer of plate thickness d are set, and if a combination having iron loss W less than or the same as the reference value $W_2$ is found in the combinations, the combination may be used. If there are a number of combinations with the iron loss less than the reference value $W_2$, a combination giving the minimum iron loss is chosen among the combinations.

Applying specific values, though the calculative plate thickness giving the minimum iron loss is 0.38 mm as described above, 0.05 mm unit is preferable in actual use, so that the plate thickness is set as 0.4 mm. It is recognized that the minimum iron loss can be obtained at 0.4 mm in the graph of FIG. 3. Under the above 0.05 mm unit, the only combination for obtaining total thickness 0.5 mm including the 0.4 mm plate thickness is one 0.4 mm plate and one 0.1 mm plate (abbreviated as (0.4*1)+(0.1*1) hereinafter). On the other hand, plate thickness of 0.35 mm and 0.3 mm giving iron loss less than the reference value $W_2$ when being used as a sole body and plate thickness 0.25 mm giving iron loss slightly greater than the reference value $W_2$ can be listed as those giving iron loss close to the 0.4 mm plate thickness, where a pair of 0.35 mm and 0.15 mm, 0.3 mmm and 0.2 mm and two 0.25 mm plates can be combined. The examples of the combinations in PC material and the actual measured value of iron loss of the respective combinations are shown in Table 2.

TABLE 2

| Lamination structure (mm*number of plate) | Iron Loss (J/mm3) |
|---|---|
| (0.5*1) | 0.659005 |
| (0.4*1) + (0.1*1) | 0.767154 |
| (0.35*1) + (0.15*1) | 0.725422 |
| (0.3*1) + (0.2*1) | 0.700383 |
| (0.25*2) | 0.692037 |

As shown in the Table 2, in the pair of (0.4*1)+(0.1*1), (0.35*1)+(0.15*1) and (0.3*1)+(0.2*1), though the single body of plate material having thickness from 0.3 mm to 0.4 mm gives iron loss less than the reference value $W_2$, the respective iron loss of the combination after being laminated exceeds the reference value $W_2$ and is not suitable for practical use. However, though the single body of plate of 0.25 mm thickness gives iron loss slightly exceeding the reference value $W_2$, the iron loss after the pair of (0.25*2) being laminated is within the reference value $W_2$, so that the combination can be practically used.

As described above, it can be understood that the single layer of (0.5*1) and the combination of (0.25*2) can be used for the stator 22. Especially, the single layer of (0.5*1) gives smaller iron loss than the combination of (0.25*2) and is composed of a single layer, so that production process can be simplified.

According to the above setting process, the single-layer PC plate of 0.5 mm plate thickness is the most preferable, and the lamination of two PC plates of 0.25 mm plate thickness is preferable in the second place.

Similarly, examples of combination of Supermalloy and actual measure value of the iron loss of respective combinations are shown in Table 3.

TABLE 3

| Lamination structure (mm*number of plate) | Iron Loss (J/mm3) |
|---|---|
| (0.5*1) | 0.468071 |
| (0.4*1) + (0.1*1) | 0.385284 |
| (0.35*1) + (0.15*1) | 0.343553 |
| (0.3*1) + (0.2*1) | 0.318514 |
| (0.25*2) | 0.310167 |
| (0.2*2) + (0.1*1) | 0.302498 |
| (0.15*2) + (0.2*1) | 0.294152 |
| (0.15*3) + (0.05*1) | 0.319868 |
| (0.1*5) | 0.337237 |

In Table 3, the combinations from (0.5*1) to (0.25*2) are set in the same manner as the above Table 2 (the example of PC material). Further, the plate thickness range giving iron loss less than the reference value $W_2$ is widely extended from 0.038 mm to 0.75 mm. Accordingly, the example combinations using 0.1 mm, 0.15 mm and 0.2 mm thick plates are added.

According to Table 3, all the combinations show iron loss below the reference value $W_2$ and can be used. Among them, the combination (0.15*2)+(0.2*1) including plate thickness D=0.2 mm shows the minimum iron loss for the stator 22, so that the combination is preferably used when preference is given to the magnetic characteristics.

However, since lamination of the components of different plate thickness of one 0.20 mm and two 0.15 mm is required, assembly processiblity is deteriorated. Accordingly, considering the iron loss W is only 0.31 (J/m³) for 0.25 mm plate thickness when the Supermalloy material having small absolute value of iron loss is used, the combination of laminating two 0.25 mm thickness plates may be selected in view of the assembly processiblity.

In general, the Supermalloy material is superior in magnetic characteristics relative to PC material as shown in single-digit smaller hysteresis loss coefficient. As compared to the above-described PC material, the minimum iron loss is approximately half, i.e. 0.3 (J/m³), at the same frequency (f=8Hz) and maximum amplitude magnetic flux density ($B_m$=0.2 T). The iron loss is generally decreased in other plate thickness range, showing superior magnetic characteristics. The plate thickness d at the minimum iron loss is approximately 0.2 mm, which is half of the arrangement using the PC material. Accordingly, the iron loss can be further decreased and plate thickness can be reduced by using the Supermalloy, so that a thinner and more efficient power generator can be made.

Incidentally, in selecting the laminating plate materials, restriction of minimum thickness may preferably be provided for each material in order to secure mechanical strength.

For instance, the minimum thickness is preferably restricted to 0.15 mm when PC permalloy is used, to 0.10 mm when Supermalloy is used, and to 0.25 mm when PD permalloy is used.

According to the above embodiment, following advantages can be obtained.

(1) When the material used for the stator 22 and the frequency and maximum amplitude magnetic flux density of the power generator 20 are determined, the plate thickness d of the stator (magnetic core) 22 can be easily calculated using the above-described formula (1). Accordingly, as compared to conventional arrangement where the most appropriate dimension has to be calculated after repeating trial manufacture, the power generator 20 having small iron loss can be easily designed and manufactured and the efficiency of the power generator can be easily improved.

(2) Since the relationship between the plate thickness and the iron loss can be clarified based on the-above-described formula (6), even when the plate thickness cannot be set at a plate thickness giving the minimum iron loss on account of other conditions, the power generator 20 of iron loss as small as possible can be easily produced by laminating the plate materials while satisfying the other conditions.

(3) Since the hysteresis loss coefficient $k_h$ and eddy-current loss coefficient $k_e$ differing according to the material of the stator 22 can be obtained in advance by experiment etc., the relationship between the iron loss and the plate thickness when the material of the stator 22 is changed can be easily calculated. Accordingly, selection of the most suitable material and plate thickness setting can be extremely easily conducted in designing the power generator 20, so that the design efficiency can be improved.

(4) Since the iron loss of the power generator 20 can be reduced and the efficiency can be improved, the loss of energy in generating the power by rotating the rotor 21 by the main spring 2a can be decreased and the mechanical energy required for generating a predetermined amount of power can also be decreased, so that the duration of the main spring 2a can be extended, thereby obtaining a timepiece 1 capable of sustaining for a long time period.

Further, since the required mechanical energy can be reduced for obtaining the same duration, the size and thickness of the main spring 2a, i.e., the timepiece 1, can be reduced.

Figure 5:
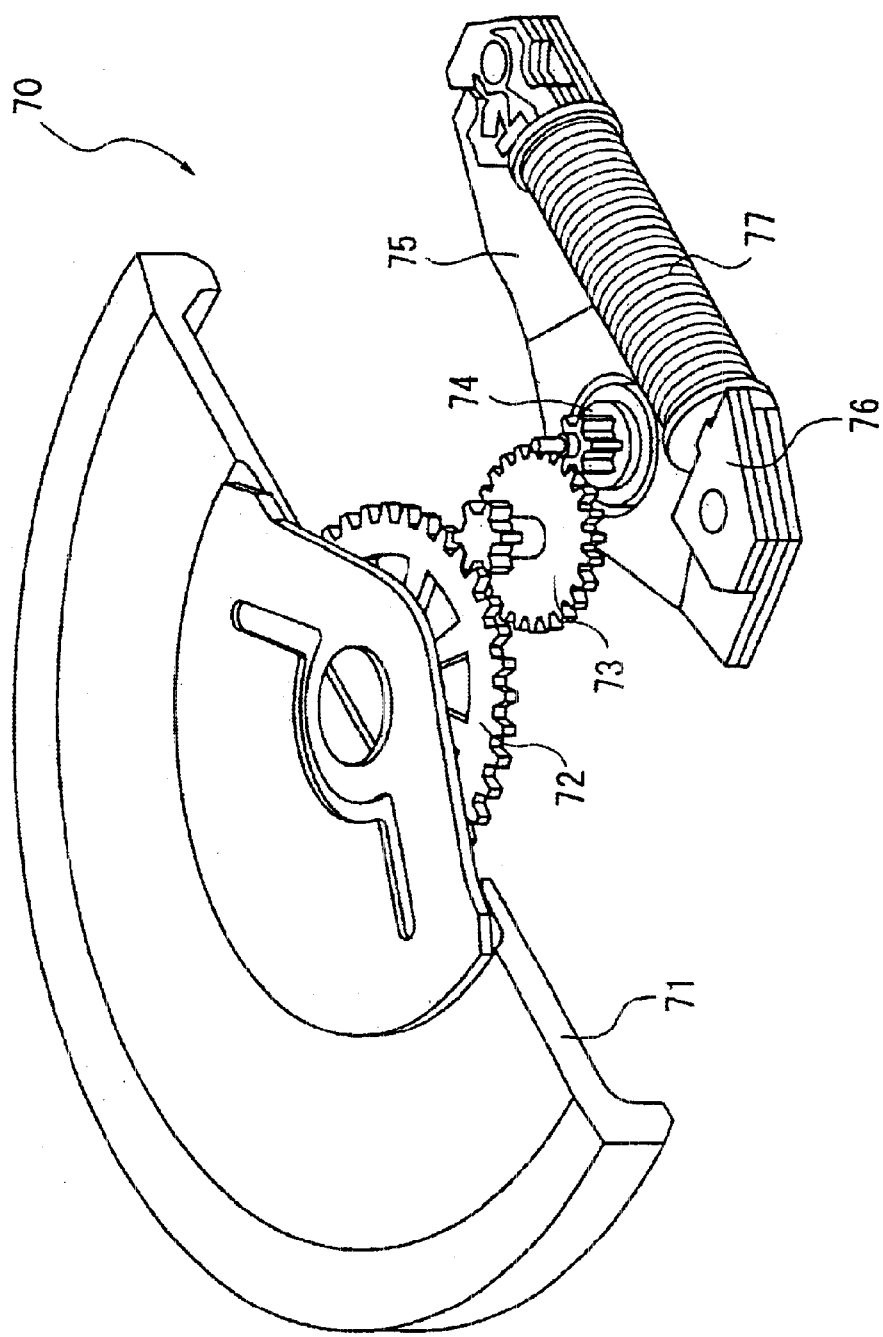
FIG. 5 is a schematic perspective view showing a power generator according to another embodiment of the present invention.

FIG. 5 shows another embodiment of the present invention.

A power generator (power-generating device) 70 according to the present embodiment has an eccentric oscillating weight 71 rotated by a hand movement. Specifically, the power generator 70 has the oscillating weight 71, gears 72 and 73 as a transferring mechanism for transferring kinetic energy from the oscillating weight, a rotor 74 rotated by the gear 73, a stator 75 having a rotor hole where the rotor 74 is disposed, a magnetic core 76 constituting a magnetic circuit together with the stator 75 and the rotor 74, and a power-generating coil wound around the magnetic core 76.

In the power generator 70, the plate thickness of the stator 75 and the magnetic core 76 giving the minimum iron loss W can be calculated according to the present invention when the material, frequency and the maximum amplitude magnetic flux density are determined.

In the stator 75 of the power generator 70, the average frequency f can be set as f=50 (Hz) and the maximum amplitude magnetic flux density $B_m$ can be set as $B_m$=0.65 (T). Supermalloy material and PC material can be used for the stator 75.

Figure 6:
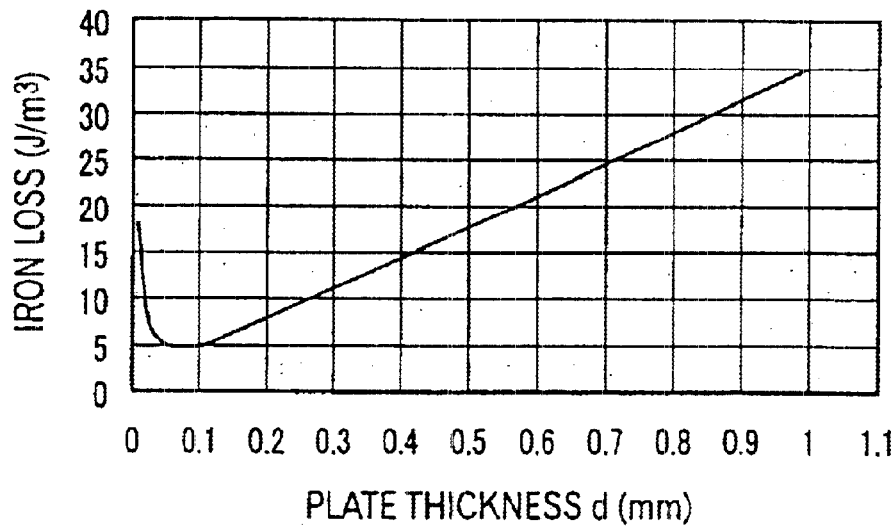
FIG. 6 is a graph showing a relationship between iron loss and plate-thickness in a stator of the embodiment shown in FIG. 5 using Supermalloy material.

Initially, when Supermalloy material is used for the stator 75, the minimum value $W_1$ of the iron loss is approximately 5.295(J/m³) from the formulae (1) and (6) and the plate thickness d at the time is d=0.1 mm. The relationship between the iron loss W and the plate thickness d at the time is as shown in the graph of FIG. 6. Accordingly, when the plate thickness giving minimum iron loss cannot be set on account of other conditions, other plate thickness around the minimum value may be set based on the graph.

For instance, when the reference value $W_2$ of iron loss is 19.114J/m³ (approximately 3.634 times greater than the minimum value $W_1$) and the iron loss below the reference value $W_2$ is preferably obtained, the plate thickness d may preferably be set within the range of 0.01 to 0.5 mm.

When the total thickness D of 0.5 mm of the stator 75 is obtained, the iron loss can be minimized by laminating five plates of 0.1 mm thick or ten plates of 0.05 mm thick as shown in the following Table 4. However, since the 0.05 mm thick Supermalloy material is thin, assembling and handling processes and productivity improvement are difficult, the combination of laminating five 0.1 mm thick plates is the most preferable.

TABLE 4

| Lamination structure (mm*number of plate) | Iron Loss (J/mm3) |
|---|---|
| (0.2*2) + (0.1*1) | 7.337195 |
| (0.25*2) | 9.421637 |
| (0.15*3) + (0.05*1) | 6.298179 |
| (0.05*10) | 5.291201 |
| (0.15*2) + (0.2*1) | 6.98872 |
| (0.1*5) | 5.259162 |

Next, when PC permalloy is used for the stator 75, the minimum value $W_1$ of the iron loss is approximately 10.86 (J/m³) based on the formulae (1) and (6) and the plate thickness d at the time is d=0.15 mm. The relationship between the iron loss W and the plate thickness d can be represented as in the graph of FIG. 7. In order to set the reference value $W_2$ of the iron loss as 19.114J/m³ (approximately 1.760 times as great as the minimum value $W_1$) and to obtain the iron loss less than the reference value $W_2$, the plate thickness d may preferably be set within the range of approximately 0.05 to 0.45 mm.

In order to obtain total thickness D=0.5 mm of the stator 75, the combination of laminating two 0.15 mm thick plates and one 0.2 mm plate is the most preferable as shown in Table 5 below.

TABLE 5

| Lamination structure (mm*number of plate) | Iron Loss (J/mm3) |
|---|---|
| (0.15*3) + (0.05*1) | 11.63832 |
| (0.1*5) | 11.93434 |
| (0.15*2) + (0.2*1) | 10.99382 |
| (0.2*2) + (0.1*1) | 11.3423 |
| (0.25*2) | 12.09171 |

As described above, a power generator 70 of small iron loss can be designed and manufactured considering various conditions such as thickness of the stator 75 and the lamination construction, thereby improving efficiency of the power generator 70. Accordingly, the size of electronic device such as timepiece incorporating the power generator 70 can be reduced, and the duration thereof can be lengthened.

In the power generator 70, when the material, frequency and maximum amplitude magnetic flux density are determined, the plate thickness of the stator 75 and the magnetic core 76 having the minimum iron loss W can be obtained in accordance with the present invention.

PB material (PB permalloy material), PD material (PD permalloy material) are used as the magnetic core 76 of the power generator 70. The average frequency f and the maximum amplitude magnetic flux density $B_m$ of the PB material can be set as f=50 (Hz) and $B_m$=0.9 (T). The average frequency f and the maximum amplitude magnetic flux density $B_m$ of the PD material can be set as f=50 (Hz) and Bm=0.75 (T).

The PB material and the PD material are inferior to the PC material in the magnitude of iron loss. However, since the coil 77 is wound for a multiple of times so that the thickness is increased, the PB material and PD material having greater saturation magnetic flux density than the PC material may preferably be used for the magnetic core where the size (cross section) thereof is desirably reduced.

Figure 8:
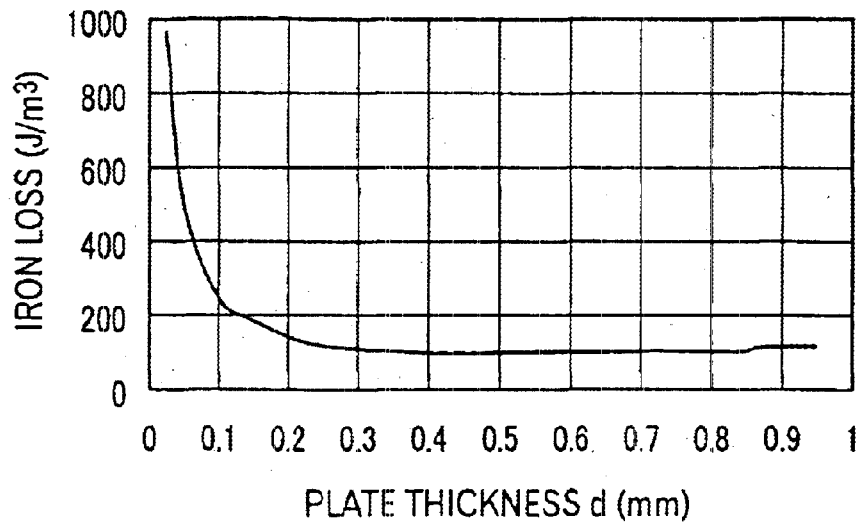
FIG. 8 is a graph showing a relationship between iron loss and plate thickness in a magnetic core of the embodiment shown in FIG. 5 using PB material.
Figure 9:
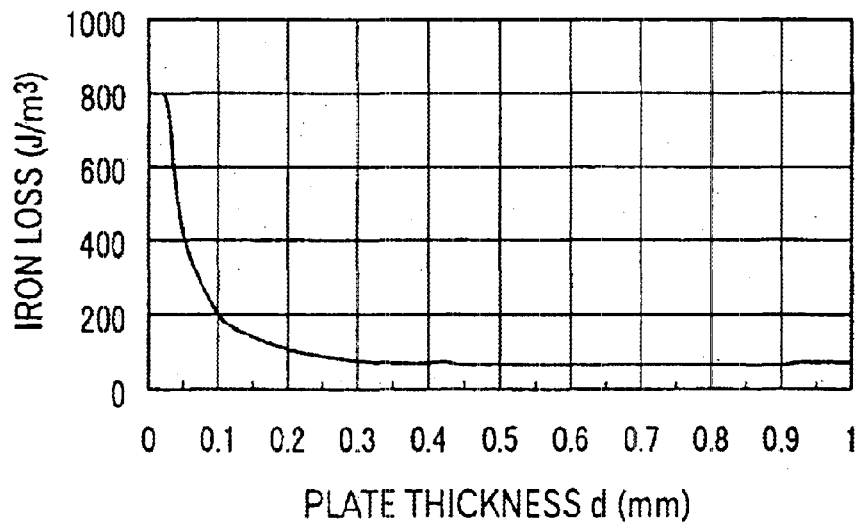
FIG. 9 is a graph showing a relationship between iron loss and plate thickness in a magnetic core of the embodiment shown in FIG. 5 using PD material.

As shown in FIGS. 8 and 9, the minimum value of the iron core W is approximately 50 to 80 (J/m³), which is greater than the PC material. Though the iron loss W is sharply increased in accordance with reduction in the plate thickness below a predetermined plate thickness range (0.2 mm, for instance), the iron loss W is hardly changed without increase above the predetermined plate thickness, thereby keeping a predetermined value. Accordingly, a magnetic core 76 capable of reducing the iron loss W and satisfying the other condition can be manufactured by designing considering such characteristics.

Accordingly, in the power generator 70, the magnetic core 76 may most preferably be constructed of a single PD material of 0.5 mm plate thickness. On the other hand, though the stator 75 may be constructed of a combination of two PC materials of 0.15 mm thick and one PC material of 0.2 mm thick, the stator 75 may most preferably be constructed by laminating ten Supermalloy materials of 0.05 mm thick.

Incidentally, the scope of the present invention is not restricted to the above embodiment, but includes modifications and improvement as long as an object of the present invention can be achieved.

For instance, the timepiece where the power generator of the present invention is incorporated is not restricted to wrist watch but may be various timepiece such as table clock and clocks and devices having functions other than timepiece such as cellular phone, pager, desk-top calculator, portable personal computer and portable radio. The time-displaying processing device for may not be a hand 10 as in the aforesaid embodiment, but may be a liquid crystal display for digitally displaying time.

The power generator of the present invention is not restricted to be incorporated in a timepiece, but may be used in various electronic devices such as a portable sphygmomanometer, cellular phone, PHS, pager, pedometer, desk-top calculator, personal computer such as a notebook personal computer, electronic databook, PDA (small-size information terminal: Personal Digital Assistant), portable radio, toy, IC card, automobile and house key. In other words, the present invention can be widely applied to electronic devices consuming electric power. Especially, since the plate thickness of the stator and the magnetic core can be designed to decrease the iron loss, the duration of the power generator can be lengthened and the size of the oscillating weight etc. can be reduced, thereby obtaining extremely small power generator, so that the power generator can be suitably used for various electronic devices having size reduced for portable use.

Though dry cell and battery charger are conventionally used in the portable electronic devices, the processing devices such as electronic circuit and mechanical system can be driven without employing batteries by installing the power generator of the present invention, thereby eliminating the need for exchanging the batteries while responding to environmental concern. Further, since the electric power can be manually generated by installing the oscillating weight and main spring, power charge work as in a battery charger can be eliminated and the electronic devices can be driven during disaster and on outdoor circumstance.

The material, the frequency and the maximum amplitude magnetic flux density of the power generators 20 ad 70 may be changed as desired, where the iron loss W and the plate thickness d may be set in accordance with the above-described process.

Figure 7:
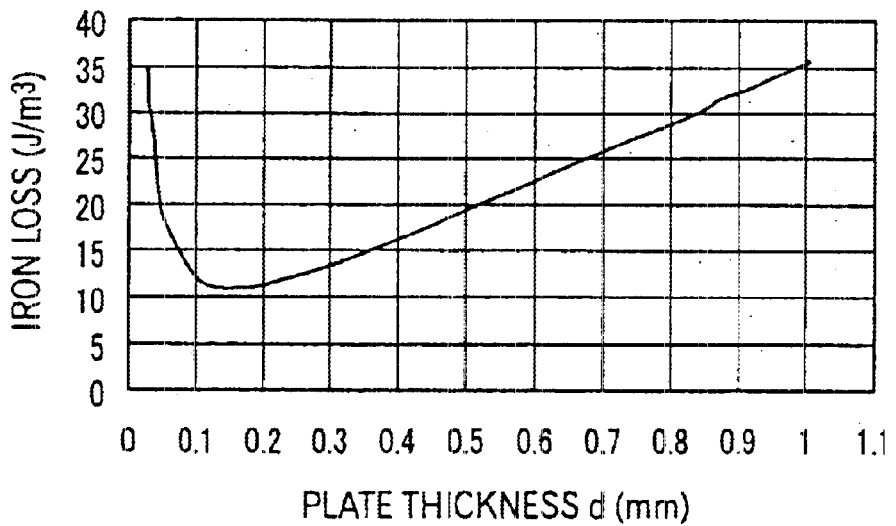
FIG. 7 is a graph showing a relationship between iron loss and plate thickness in a stator of the embodiment shown in FIG. 5 using PC material.
Figure 10:
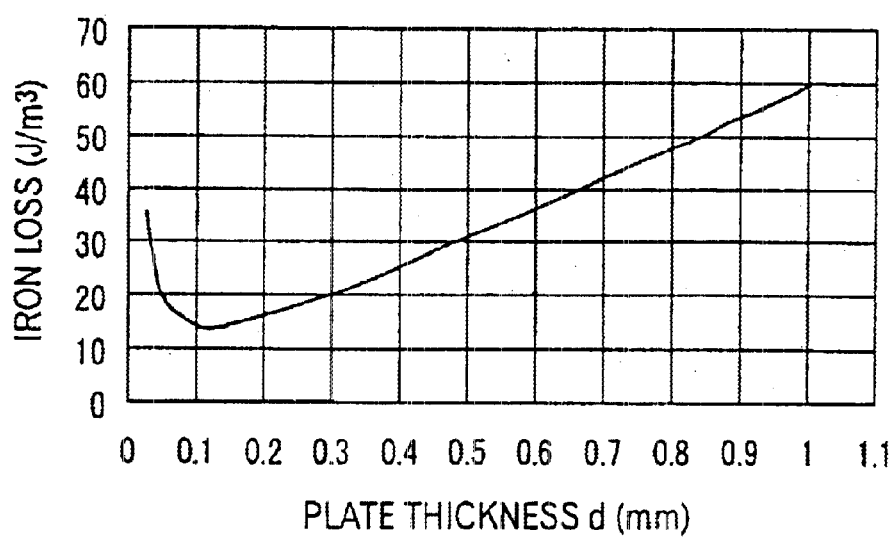
FIG. 10 is a graph showing a relationship between iron loss and plate thickness in a modification of FIG. 5 using PC material as a magnetic core.

For instance, FIG. 10 shows an example of the stator 75 of the embodiment shown in the above-described FIG. 5 where only the frequency is doubled under the same condition as in FIG. 7. As can be seen by comparing FIG. 10 with FIG. 7, the iron loss increases in proportion to increase in frequency. However, the entire tendency such as, for instance, the plate thickness of the minimum iron loss, stays constant at approximately 0.12 to 0.16 mm and the ratio of the iron loss increasing in accordance with the increase in plate thickness (inclination angle of graph) etc. are almost coincided.

Accordingly, since the rotor 74 is not rotated at a regular speed in the power generator 70 for driving the rotor 74 by the oscillating weight 71, it is important to design the power generator considering change in frequency.

According to the present invention, since the plate thickness of the stator and magnetic core capable of decreasing the iron loss can be calculated without actually producing a trial piece, the design efficiency can be improved and development time can be shortened, thereby easily manufacturing highly efficient power generator.

INDUSTRIAL AVAILABILITY

The present invention relates to a power generator and a method of setting plate thickness in a magnetic circuit thereof, which can be suitably used as power generator for various small-size and portable electronic devices such as cellular phone and portable information devices and electronically controlled timepiece.

What is claimed is:

1. A power generator, comprising:
a rotor having a permanent magnet;
a stator and a magnetic core of soft magnetic material constituting a magnetic circuit; and
a coil wound around the magnetic core,
wherein the plate thickness d (m) of the soft magnetic material constituting at least one of the stator and the magnetic core is set at a value represented by the following formula of $$d = \sqrt{\frac{k_h}{k_e}\rho} \cdot f^{-0.375} B_m^{0.175} \tag{1}$$

where $k_h$ represents hysteresis loss coefficient, $k_e$ represents eddy-current loss coefficient, $\rho$ ($\Omega \cdot$m) represents resistivity, f (Hz) represents frequency and $B_m$ (T) represents maximum amplitude magnetic flux density of the soft magnetic material.

2. The power generator according to claim 1, wherein the soft magnetic material constituting at least one of the stator and the magnetic core is PC permalloy material, and the plate thickness d (m) of the PC permalloy material is set at a value represented by the following formula of $$d = \sqrt{0.654\rho} \cdot f^{-0.375} B_m^{-0.175} \tag{2}$$

where $\rho$ ($\Omega \cdot$m) represents resistivity, f (Hz) represents frequency and $B_m$ (T) represents maximum amplitude magnetic flux density of the PC permalloy material.

3. The power generator according to claim 1, wherein the soft magnetic material constituting at least one of the stator and the magnetic core is Supermalloy material, and the plate thickness d (m) of the Supermalloy material is set at a value represented by the following formula of $$d = \sqrt{0.137\rho} \cdot f^{-0.375} B^{-0.175} \quad (3)$$

where $\rho$ ($\Omega \cdot m$) represents resistivity, f (Hz) represents frequency and $B_m$ (T) represents maximum amplitude magnetic flux density of the Supermalloy material.

4. The power generator according to claim 1, wherein the soft magnetic material constituting at least one of the stator and the magnetic core is PD permalloy material, and the plate thickness d (m) of the PD permalloy material is set at a value represented by the following formula of $$d = \sqrt{1.339\rho} \cdot f^{-0.375} B^{-0.175} \quad (4)$$

where $\rho$ ($\Omega \cdot m$) represents resistivity, f (Hz) represents frequency and $B_m$ (T) represents maximum amplitude magnetic flux density of the PD permalloy material.

5. The power generator according to claim 1 wherein the soft magnetic material constituting at least one of the stator and the magnetic core is PB permalloy material, and the plate thickness d (in) of the PB permalloy material is set at a value represented by the following formula of $$d = \sqrt{3.049\rho} \cdot f^{-0.375} B^{-0.175} \quad (5)$$

where $\rho$ ($\Omega \cdot m$) represents resistivity, f (Hz) represents frequency and $B_m$ (T) represents maximum amplitude magnetic flux density of the PB permalloy material.

6. The power generator according to claim 1, wherein at least one of the stator and the magnetic core is made of a single layer or a lamination of the soft magnetic material of the plate thickness d.

7. The power generator according to claim 6, wherein the soft magnetic material constituting at least one of the stator and the magnetic core has a lamination structure, and the respective layers forming the lamination structure have a minimum thickness of not less than 0.05 mm.

8. A power generator, comprising:

a rotor having a permanent magnet;

a stator and a magnetic core of soft magnetic material constituting a magnetic circuit; and a coil wound around the magnetic core, wherein the plate thickness d (m) of the soft magnetic material constituting at least one of the stator and the magnetic core is set within a plate thickness range determined so that iron loss W does not exceed a reference value $W_2$, the reference value $W_2$ being obtained by a thickness d obtained in accordance with the following formula of $$d = \sqrt{\frac{k_h}{k_e}\rho} \cdot f^{-0.375} B_m^{-0.175} \quad (1)$$

where $k_h$ represents hysteresis loss coefficient, $k_e$ represents eddy-current loss coefficient, $\rho$ ($\Omega \cdot m$) represents resistivity, f (Hz) represents frequency and $B_m$ (T) represents maximum amplitude magnetic flux density of the soft magnetic material, which is assigned to the following formula of $$W \cong k_h d^{-1} B_m^{1.65} + k_e \frac{1}{\rho} df^{0.75} B_m^2 \quad (6)$$

to calculate a minimum value $W_1$ of the iron loss W (J/m$^3$), the reference value $W_2$ being set greater than the minimum value $W_1$.

9. The power generator according to claim 8, wherein the soft magnetic material constituting at least one of the stator and the magnetic core is PC permalloy material, and the plate thickness d (m) of the PC permalloy material is set within a plate thickness range determined so that iron loss W does not exceed a reference value $W_2$, the reference value $W_2$ being obtained by a thickness d obtained in accordance with the following formula of $$d = \sqrt{0.654\rho} \cdot f^{-0.375} B^{-0.175} \quad (2)$$

where $\rho$ ($\Omega \cdot m$) represents resistivity, f (Hz) represents frequency and $B_m$ (T) represents maximum amplitude magnetic flux density of the PC permalloy material, which is assigned to the following formula of $$W \cong 1.72 \times 10^{-3} d^{-1} B_m^{1.65} + 2.63 \times 10^{-3} \frac{1}{\rho} df^{0.75} B_m^2 \quad (7)$$

to calculate a minimum value $W_1$ of the iron loss W (J/m$^3$), the reference value $W_2$ being set 1.088 times as great as the minimum value $W_1$.

10. The power generator according to claim 8, wherein the soft magnetic material constituting at least one of the stator and the magnetic core is PC permalloy material, and the plate thickness d (in) of the PC permalloy material is set within a plate thickness range determined so that iron loss W does not exceed a reference value $W_2$, the reference value $W_2$ being obtained by a thickness d obtained in accordance with the following formula of $$d = \sqrt{0.654\rho} \cdot f^{-0.375} B^{-0.175} \quad (2)$$

where $\rho$ ($\Omega \cdot m$) represents resistivity, f (Hz) represents frequency and $B_m$ (T) represents maximum amplitude magnetic flux density of the PC permalloy material, which is assigned to the following formula of $$W \cong 1.72 \times 10^{-3} d^{-1} B_m^{1.65} + 2.63 \times 10^{-3} \frac{1}{\rho} df^{0.75} B_m^2 \quad (7)$$

to calculate a minimum value $W_1$ of the iron loss W (J/m$^3$), the reference value $W_2$ being set 1.760 times as great as the minimum value $W_1$.

11. The power generator according to claim 8, wherein the soft magnetic material constituting at least one of the stator and the magnetic core is Supermalloy material, and the plate thickness d (m) of the Supermalloy material is set within a plate thickness range determined so that iron loss W does not exceed a reference value $W_2$, the reference value $W_2$ being obtained by a thickness d obtained in accordance with the following formula of $$d = \sqrt{0.137\rho} \cdot f^{-0.375} B^{-0.175} \quad (3)$$

where $\rho$ ($\Omega \cdot m$) represents resistivity, f (Hz) represents frequency and $B_m$ (T) represents maximum amplitude magnetic flux density of the Supermalloy material, which is assigned to the following formula of $$W \cong 0.36 \times 10^{-3} d^{-1} B_m^{1.65} + 2.63 \times 10^{-3} \frac{1}{\rho} df^{0.75} B_m^2 \quad (8)$$

to calculate a minimum value $W_1$ of the iron loss $W$ (J/m$^3$), the reference value $W_2$ being set 2.355 times as great as the minimum value $W_1$.

12. The power generator according to claim 8,
wherein the drive source of the power generator is an oscillating weight rotated by an external force,
wherein the soft magnetic material constituting at least one of the stator and the magnetic core is Supermalloy material, and the plate thickness d (m) of the Supermalloy material is set within a plate thickness range determined so that iron loss W does not exceed a reference value $W_2$, the reference value $W_2$ being obtained by a thickness d obtained in accordance with the following formula of $$d = \sqrt{0.137 \rho} \cdot f^{-0.375} B^{-0.175} \quad (3)$$

where $\rho$ ($\Omega \cdot$m) represents resistivity, f(Hz) represents frequency and $B_m$ (T) represents maximum amplitude magnetic flux density of the Supermalloy material, which is assigned to the following formula of $$W \cong 0.36 \times 10^{-3} d^{-1} B_m^{1.65} + 2.63 \times 10^{-3} \frac{1}{\rho} df^{0.75} B_m^2 \quad (8)$$

to calculate a minimum value $W_1$ of the iron loss $W$ (J/m$^3$), the reference value $W_2$ being set 3.634 times as great as the minimum value $W_1$.

13. The power generator according to claim 8,
wherein the soft magnetic material constituting at least one of the stator and the magnetic core is PD permalloy material, and the plate thickness d (m) of the PD permalloy material is set within a plate thickness range determined so that iron loss W does not exceed a reference value $W_2$, the reference value $W_2$ being obtained by a thickness d obtained in accordance with the following formula of $$d = \sqrt{1.339 \rho} \cdot f^{-0.375} B^{-0.175} \quad (4)$$

where $\rho$ ($\Omega \cdot$m) represents resistivity, f (Hz) represents frequency and $B_m$ (T) represents maximum amplitude magnetic flux density of the PD permalloy material, which is assigned to the following formula of $$W \cong 23.58 \times 10^{-3} d^{-1} B_m^{1.65} + 2.63 \times 10^{-3} \frac{1}{\rho} df^{0.75} B_m^2 \quad (9)$$

to calculate a minimum value $W_1$ of the iron loss $W$ (J/m$^3$), the reference value $W_2$ being set 3.634 times as great as the minimum value $W_1$.

14. The power generator according to claim 8, wherein at least one of the stator and the magnetic core is made of a single layer or a lamination of the soft magnetic material of the plate thickness d.

15. The power generator according to claim 14, wherein the soft magnetic material constituting at least one of the stator and the magnetic core has a lamination structure, and the respective layers forming the lamination structure have a minimum thickness of not less than 0.05 mm.

16. An electronic device, comprising:
a power generator comprising:
a rotor having a permanent magnet;
a stator and a magnetic core of soft magnetic material constituting a magnetic circuit; and
a coil wound around the magnetic core,
wherein the plate thickness d (in) of the soft magnetic material constituting at least one of the stator and the magnetic core is set at a value represented by the following formula of $$d = \sqrt{\frac{k_h}{k_e} \rho} \cdot f^{-0.375} B_m^{-0.175} \quad (1)$$

where $k_h$ represents hysteresis loss coefficient, $k_e$ represents eddy-current loss coefficient, $\rho$ ($\Omega \cdot$m) represents resistivity, f (Hz) represents frequency and $B_m$ (T) represents maximum amplitude magnetic flux density of the soft magnetic material; and
a processor actuated by the electric energy generated by the power generator.

17. An electronically controlled timepiece, comprising:
a power generator comprising:
a rotor having a permanent magnet;
a stator and a magnetic core of soft magnetic material constituting a magnetic circuit; and
a coil wound around the magnetic core,
wherein the plate thickness d (m) of the soft magnetic material constituting at least one of the stator and the magnetic core is set at a value represented by the following formula of $$d = \sqrt{\frac{k_h}{k_e} \rho} \cdot f^{-0.375} B_m^{-0.175} \quad (1)$$

18. A method of setting plate thickness in a magnetic circuit in a power generator, the power generator including a rotor having a permanent magnet, a stator and a magnetic core made of a soft magnetic material constituting the magnetic circuit and a coil wound around the magnetic core,
wherein the plate thickness d of at least one of the stator and the magnetic core is set at a value represented by the following formula of $$d = \sqrt{\frac{k_h}{k_e} \rho} \cdot f^{-0.375} B_m^{-0.175} \quad (1)$$

where $k_h$ represents hysteresis loss coefficient, $k_e$ represents eddy-current loss coefficient, $\rho$ ($\Omega \cdot$m) represents resistivity, f (Hz) represents frequency and $B_m$ (T) represents maximum amplitude magnetic flux density of the soft magnetic material.

19. A method of setting plate thickness in a magnetic circuit in a power generator, the power generator including a rotor having a permanent magnet, a stator and a magnetic core made of a soft magnetic material constituting the magnetic circuit and a coil wound around the magnetic core,
wherein the plate thickness d of at least one of the stator and the magnetic core is set within a plate thickness range determined so that iron loss W does not exceed a reference value $W_2$, the reference value $W_2$ being obtained by a thickness d obtained in accordance with the following formula of $$d = \sqrt{\frac{k_h}{k_e}\rho} \cdot f^{-0.375} B_m^{-0.175} \quad (1)$$

where $k_h$ represents hysteresis loss coefficient, $k_e$ represents eddy-current loss coefficient, $\rho$ ($\Omega\cdot$m) represents resistivity, f (Hz) represents frequency and Bm (T) represents maximum amplitude magnetic flux density of the soft magnetic material, which is assigned to the following formula of $$W \cong k_h d^{-1} B_m^{1.65} + k_e \frac{1}{\rho} df^{0.75} B_m^2 \quad (6)$$

to calculate a minimum value $W_1$ of the iron loss W (J/m$^3$), the reference value $W_2$ being set greater than the minimum value $W_1$.

20. The method of setting plate thickness in a magnetic circuit in a power generator according to claim 19, wherein the soft magnetic material constituting at least one of the stator and the magnetic core is PC permalloy material, and the plate thickness d (m) of the PC permalloy material is set within a plate thickness range determined so that iron loss W does not exceed a reference value $W_2$, the reference value $W_2$ being obtained by a thickness d obtained in accordance with the following formula of $$d = \sqrt{0.654\rho} \cdot f^{-0.375} B^{-0.175} \quad (2)$$

where $\rho$ ($\Omega\cdot$m) represents resistivity, f (Hz) represents frequency and $B_m$ (T) represents maximum amplitude magnetic flux density of the PC permalloy material, which is assigned to the following formula of $$W \cong 1.72 \times 10^{-3} d^{-1} B_m^{1.65} + 2.63 \times 10^{-3} \frac{1}{\rho} df^{0.75} B_m^2 \quad (7)$$

to calculate a minimum value $W_1$ of the iron loss W (J/m$^3$), the reference value $W_2$ being set 1.088times as great as the minimum value $W_1$ when a drive source of the power generator is not an oscillating weight rotated by an external force, and the reference value $W_2$ being set 1.760times as great as the minimum value $W_1$ when a drive source of the power generator is an oscillating weight rotated by an external force.

21. The method of setting plate thickness in a magnetic circuit in a power generator according to claim 19, wherein the soft magnetic material constituting at least one of the stator and the magnetic core is Supermalloy material, and the plate thickness d (m) of the Supermalloy material is set within a plate thickness range determined so that iron loss W does not exceed a reference value $W_2$, the reference value $W_2$ being obtained by a thickness d obtained in accordance with the following formula of $$d = \sqrt{0.137\rho} \cdot f^{-0.375} B^{-0.175} \quad (3)$$

where $\rho$ ($\Omega\cdot$m) represents resistivity, f (Hz) represents frequency and $B_m$ (T) represents maximum amplitude magnetic flux density of the Supermalloy material, which is assigned to the following formula of $$W \cong 0.36 \times 10^{-3} d^{-1} B_m^{1.65} + 2.63 \times 10^{-3} \frac{1}{\rho} df^{0.75} B_m^2 \quad (8)$$

to calculate a minimum value $W_1$ of the iron loss W (J/m$^3$), the reference value $W_2$ being set 2.355times as great as the minimum value $W_1$ when a drive source of the power generator is not an oscillating weight rotated by an external force, and the reference value $W_2$ being set 3.634times as great as the minimum value $W_1$ when a drive source of the power generator is an oscillating weight rotated by an external force.

22. The method of setting plate thickness in a magnetic circuit in a power generator according to claim 19, wherein the soft magnetic material constituting at least one of the stator and the magnetic core is PD permalloy material, and the plate thickness d (m) of the PD permalloy material is set within a plate thickness range determined so that iron loss W does not exceed a reference value $W_2$, the reference value $W_2$ being obtained by a thickness d obtained in accordance with the following formula of $$d = \sqrt{1.339\rho} \cdot f^{-0.375} B^{-0.175} \quad (4)$$

where $\rho$ ($\Omega\cdot$m) represents resistivity, f (Hz) represents frequency and $B_m$(T) represents maximum amplitude magnetic flux density of the PD permalloy material, which is assigned to the following formula of $$W \cong 23.58 \times 10^{-3} d^{-1} B_m^{1.65} + 2.63 \times 10^{-3} \frac{1}{\rho} df^{0.75} B_m^2 \quad (9)$$

to calculate a minimum value $W_1$ of the iron loss W (J/m$^3$), the reference value $W_2$ being set 2.72times as great as the minimum value $W_1$.

23. The method of setting plate thickness in a magnetic circuit in a power generator according to claim 19, wherein, for the plate thickness d exhibiting the minimum value $W_1$ and a total thickness D required for the stator or the magnet core, when the plate thickness d exceeds the total thickness D, a single-layer structure of the thickness D is used, and when the thickness d is smaller than the total thickness D, a lamination structure of a plurality of plate materials including a layer of the plate thickness d is used.

24. The method of setting plate thickness in a magnetic circuit in a power generator according to claim 19, wherein a first plurality of combinations of a plurality of plate materials including a layer of the thickness d exhibiting the minimum value $W_1$ are set in constructing the lamination structure and a combination among the first plurality of combinations exhibiting the iron loss W not more than the reference value $W_2$ is adopted when there is the combination exhibiting the iron loss not more than the reference value $W_2$ in the first combinations, and, when there is no combination exhibiting the iron loss not more than the reference value $W_2$ in the first combinations, a second plurality of combinations of a plurality of plate materials of total thickness D including a layer of iron loss greater than the layer of the plate thickness d are set and a combination among the second plurality of combinations exhibiting the iron loss W not more than the reference value $W_2$ is adopted when there is the combination exhibiting the iron loss not more than the reference value $W_2$ in the second combinations.

where $k_h$ represents hysteresis loss coefficient, $k_e$ represents eddy-current loss coefficient, $\rho$ ($\Omega\cdot$m) represents resistivity, f (Hz) represents frequency and $B_m$ (T)

represents maximum amplitude magnetic flux density of the soft magnetic material; and a processor for driving a time display by the electric energy generated by the power generator.

25. The method of setting plate thickness in a magnetic circuit in a power generator according to claim 23, wherein the soft magnetic material constituting at least one of the stator and the magnetic core has a lamination structure and the respective layers forming the lamination structure have a minimum thickness of not less than 0.05 mm.

26. The method of setting lace thickness in a magnetic circuit in a power generator according to claim 24, wherein the soft magnetic material constituting at least one of the stator and the magnetic core has a lamination structure and the respective layers forming the lamination structure have a minimum thickness of not less than 0.05 mm.

27. An electronic device, comprising:

a power generator comprising:
  a rotor having a permanent magnet;
  a stator and a magnetic core of soft magnetic material constituting a magnetic circuit; and
  a coil wound around the magnetic core,
  wherein the plate thickness d (in) of the soft magnetic material constituting at least one of the stator and the magnetic core is set within a plate thickness range determined so that iron loss W does not exceed a reference value $W_2$, the reference value $W_2$ being obtained by a thickness d obtained in accordance with the following formula of $$d = \sqrt{\frac{k_h}{k_e}\rho} \cdot f^{-0.375} B_m^{-0.175} \qquad (1)$$

where $k_h$ represents hysteresis loss coefficient, $k_e$ represents eddy-current loss coefficient, $\rho$ ($\Omega \cdot$m) represents resistivity, f (Hz) represents frequency and $B_m$ (T) represents maximum amplitude magnetic flux density of the soft magnetic material, which is assigned to the following formula of $$W \cong k_h d^{-1} B_m^{1.65} + k_e \frac{1}{\rho} d f^{0.75} B_m^2 \qquad (6)$$

to calculate a minimum value $W_1$ of the iron loss W (J/m³), the reference value $W_2$ being set greater than the minimum value $W_1$; and a processor actuated by the electric energy generated by the power generator.

28. An electronically controlled timepiece, comprising:

a power generator comprising:
  a rotor having a permanent magnet;
  a stator and a magnetic core of soft magnetic material constituting a magnetic circuit; and
  a coil wound around the magnetic core,
  wherein the plate thickness d (in) of the soft magnetic material constituting at least one of the stator and the magnetic core is set within a plate thickness range determined so that iron loss W does not exceed a reference value $W_2$, the reference value $W_2$ being obtained by a thickness d obtained in accordance with the following formula of $$d = \sqrt{\frac{k_h}{k_e}\rho} \cdot f^{-0.375} B_m^{-0.175} \qquad (1)$$

where $k_h$ represents hysteresis loss coefficient, $k_e$ represents eddy-current loss coefficient, $\rho$ ($\Omega \cdot$m) represents resistivity, f (Hz) represents frequency and $B_m$ (T) represents maximum amplitude magnetic flux density of the soft magnetic material, which is assigned to the following formula of $$W \cong k_h d^{-1} B_m^{1.65} + k_e \frac{1}{\rho} d f^{0.75} B_m^2 \qquad (6)$$

to calculate a minimum value $W_1$ of the iron loss W (J/m³), the reference value $W_2$ being set greater than the minimum value $W_1$; and a processor for driving a time display by the electric energy generated by the power generator.

* * * * *

UNITED STATES PATENT AND TRADEMARK OFFICE
CERTIFICATE OF CORRECTION

PATENT NO.   : 6,628,037 B2   Page 1 of 2
DATED        : September 30, 2003
INVENTOR(S)  : Kinya Matsuzawa It is certified that error appears in the above-identified patent and that said Letters Patent is hereby corrected as shown below:

Column 19,
Line 5, please change "$d = \sqrt{0.137\rho} \cdot f^{-0.375} B^{-0.175}$ (3)" to -- $d = \sqrt{0.137\rho} \cdot f^{-0.375} B_m^{-0.175}$ (3) --

Line 16, please change "$d = \sqrt{1.339\rho} \cdot f^{-0.375} B^{-0.175}$ (4)" to -- $d = \sqrt{1.339\rho} \cdot f^{-0.375} B_m^{-0.175}$ (4) --

Line 25, please change "(in)" to -- (m) -- and

Line 30, please change "$d = \sqrt{3.049\rho} \cdot f^{-0.375} B^{-0.175}$ (5)" to -- $d = \sqrt{3.049\rho} \cdot f^{-0.375} B_m^{-0.175}$ (5) --

Column 20,
Line 16, please change "$d = \sqrt{0.654\rho} \cdot f^{-0.375} B^{-0.175}$ (2)" to -- $d = \sqrt{0.654\rho} \cdot f^{-0.375} B_m^{-0.175}$ (2) --

Line 34, please change "(in)" to -- (m) -- and

Line 40, please change "$d = \sqrt{0.654\rho} \cdot f^{-0.375} B^{-0.175}$ (2)" to -- $d = \sqrt{0.654\rho} \cdot f^{-0.375} B_m^{-0.175}$ (2) --

Line 61, please change "$d = \sqrt{0.137\rho} \cdot f^{-0.375} B^{-0.175}$ (3)" to -- $d = \sqrt{0.137\rho} \cdot f^{-0.375} B_m^{-0.175}$ (3) --

Column 21,
Line 20, please change "$d = \sqrt{0.137\rho} \cdot f^{-0.375} B^{-0.175}$ (3)" to -- $d = \sqrt{0.137\rho} \cdot f^{-0.375} B_m^{-0.175}$ (3) --

Line 45, please change "$d = \sqrt{1.339\rho} \cdot f^{-0.375} B^{-0.175}$ (4)" to -- $d = \sqrt{1.339\rho} \cdot f^{-0.375} B_m^{-0.175}$ (4) --

Column 22,
Line 7, please change
"(in)" to -- (m) --   "$d = \sqrt{0.654\rho} \cdot f^{-0.375} B^{-0.175}$ (2)"   -- $d = \sqrt{0.654\rho} \cdot f^{-0.375} B_m^{-0.175}$ (2) --

Column 23,
Line 30, please change to

Line 60, please change "$d = \sqrt{0.137\rho} \cdot f^{-0.375} B^{-0.175}$ (3)" to -- $d = \sqrt{0.137\rho} \cdot f^{-0.375} B_m^{-0.175}$ (3) --

Column 24,
Line 22, please change "$d = \sqrt{1.339\rho} \cdot f^{-0.375} B^{-0.175}$" to -- $d = \sqrt{1.339\rho} \cdot f^{-0.375} B_m^{-0.175}$ --

Please delete lines 65-67

UNITED STATES PATENT AND TRADEMARK OFFICE
CERTIFICATE OF CORRECTION

PATENT NO. : 6,628,037 B2
DATED : September 30, 2003
INVENTOR(S) : Kinya Matsuzawa It is certified that error appears in the above-identified patent and that said Letters Patent is hereby corrected as shown below:

Column 25,
Please delete lines 1-4.
Line 13, please change "lace" to -- plate --
Lines 28, please change "(in)" to -- (m) -- and Column 26,
Line 17, please change "(in)" to -- (m) --.

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,628,037 B2
DATED : September 30, 2003
INVENTOR(S) : Kinya Matsuzawa It is certified that error appears in the above-identified patent and that said Letters Patent is hereby corrected as shown below:

Column 22,
After line 35, please insert:
-- where $k_h$ represents hysteresis loss coefficient, $k_e$ represents eddy-current loss coefficient, $\rho$ ($\Omega \cdot m$) represents resistivity, f (Hz) represents frequency and $B_m$ (T) represents maximum amplitude magnetic flux density of the soft magnetic material; and
a processor for driving a time display by the electric energy generated by the power generator. --.

Signed and Sealed this

Thirteenth Day of September, 2005

JON W. DUDAS
*Director of the United States Patent and Trademark Office*